United States Patent [19]

Barcza

[11] Patent Number: 5,238,189

[45] Date of Patent: Aug. 24, 1993

[54] CONVERGENT-TO-DIVERGENT SEAL HINGE FOR A CONVERGENT/DIVERGENT NOZZLE

[75] Inventor: W. Kevin Barcza, Stuart, Fla.

[73] Assignee: United Technologies Corporation, Hartford, Conn.

[21] Appl. No.: 914,290

[22] Filed: Jul. 16, 1992

[51] Int. Cl.$^5$ .............................................. B64C 15/02
[52] U.S. Cl. .................................. 239/265.39; 60/230
[58] Field of Search ...................... 239/265.19, 265.41, 239/265.32, 265.39, 587.5, 587.6; 60/228, 330, 331

[56] References Cited

U.S. PATENT DOCUMENTS

| | | | |
|---|---|---|---|
| 2,616,648 | 11/1952 | Baudreck | 403/58 X |
| 4,176,792 | 12/1979 | McCardle, Jr. | 239/265.41 |
| 4,637,550 | 1/1987 | Nash | 239/265.37 |
| 4,711,461 | 12/1987 | Fromberg | 403/57 X |
| 4,756,053 | 7/1988 | Madden et al. | 239/265.37 X |
| 4,994,660 | 2/1991 | Hauer | 239/265.41 |
| 5,039,014 | 8/1991 | Lippmeier | 239/265.39 |
| 5,062,730 | 11/1991 | Tomii et al. | 403/57 |
| 5,076,496 | 12/1991 | Lippmeier | 239/265.41 |
| 5,082,182 | 1/1992 | Bruchez, Jr. et al. | 239/265.35 |

FOREIGN PATENT DOCUMENTS 476596  11/1914  France .................................. 403/57

Primary Examiner—Andres Kashnikow
Assistant Examiner—Kevin P. Weldon
Attorney, Agent, or Firm—Edward L. Kochey, Jr.

[57] ABSTRACT

A hinge for connecting a convergent seal and a divergent seal in a thrust vectoring nozzle has an intermediate yoke. This yoke carries seals contacting the convergent and divergent seals. The axis of the transverse and radial pins are longitudinally offset. The convergent seal slides in an arcuate path around the axis of the transverse pin, while the divergent seal slides in a arcuate path around the axis of the radial pin. Further, the radial pin is located toward the divergent seal side of the transverse pin.

8 Claims, 3 Drawing Sheets

CONVERGENT-TO-DIVERGENT SEAL HINGE FOR A CONVERGENT/DIVERGENT NOZZLE

DESCRIPTION

Technical Field

The invention relates to gas turbine engines and in particular to vectorable discharge nozzles therefor.

BACKGROUND OF THE INVENTION

Gas turbine engines for aircraft achieve thrust by discharging hot gases through the exhaust nozzle. Efficient operation for multi-mission application dictates the use of variable area convergent/divergent nozzles.

Variable convergent/divergent configuration is achieved in axisymmetric nozzles by the use of a plurality of circumferentially arranged flaps. Overlapping seals are located between adjacent flaps.

The hinge arrangement must be provided between each convergent flap or seal and each divergent flap or seal. Variations may be made during operation, of the throat and terminal discharge openings.

Increased maneuverability of the aircraft can be accomplished by thrust vectoring. Here the discharge of gas is vectored from the axial direction to achieve a thrust component which is up, down or sideways. As shown in U.S. Pat. No. 5,082,182 (Bruchez et al, issued Jan. 21, 1992) the vectoring may be accomplished by only. The convergent flaps and seals remain symmetrical.

The hinges between the convergent and divergent flap must be capable of rotation around both the radial axis and lateral axis of the hinge. The divergent seal must also maintain a seal against both adjacent flaps at all times to prevent leakage of the hot gas stream and loss of thrust. Furthermore a seal must be resonably maintained at the hinge between the convergent and divergent seals.

A seal hinge for this purpose must allow rotation around two axes in order to permit the divergent seal to move with and seal against the divergent flaps during vectoring. The hinge must maintain a reasonable seal at all conditions to prevent leakage of the hot gas stream and loss of thrust. The hinge must also fit within the limited space between the adjacent flap hinges.

SUMMARY OF THE INVENTION

A universal joint has a convergent yoke, an intermediate yoke and a divergent yoke. The divergent yoke is secured to a convergent seal while the divergent yoke is secured to a divergent seal. The intermediate yoke is secured to the convergent yoke with a transverse pin and secured to the divergent yoke with a radial pin. A hinge seal formed of a thin plate is secured to an intermediate yoke and slides in sealing contact with the convergent seal. This plate also slides in sealing contact with the divergent seal.

DESCRIPTION OF THE PREFERRED EMBODIMENT

Figure 1:
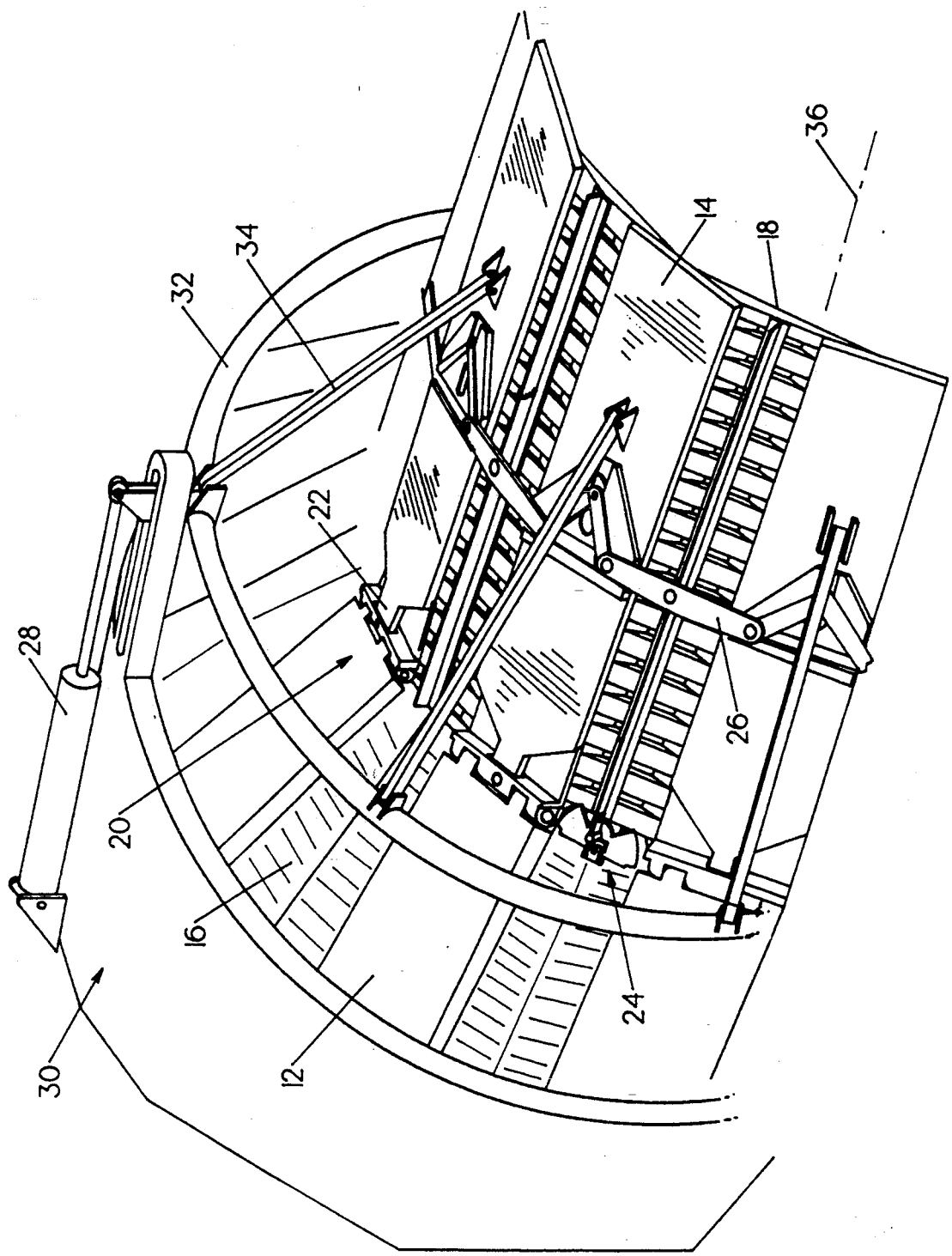
FIG. 1 is a partial isometric view of the convergent/divergent nozzle.

FIG. 1 is a general view of convergent/divergent nozzle 10 with convergent flaps 12 and divergent flaps 14. Interposed between the flaps are convergent seals 16 and divergent seals 18.

Convergent and divergent flap hinge assembly 20 includes a divergent flap hinge seal 22. This divergent flap hinge seal overlaps divergent flap 14.

Convergent to divergent seal hinge 24 joins the convergent and divergent seals. Divergent seal centering and restraining arrangement 26 centers and restrains the divergent seals 18.

Conventional drives may be used to vary the angular position of convergent flaps 12 and convergent seals 16, thereby varying the throat opening of the nozzle. Actuator 28 operating against the static upstream structure 30 drives a sync ring 32. This sync ring is connected through drive links 34 to the divergent flaps 14. By translating ring 32 rearwardly, the exit opening is reduced. By tilting the sync ring 32, the flaps 14 are vectored with relation to the nozzle axis 36 to achieve a vectoring discharge of the nozzle.

Figure 2:
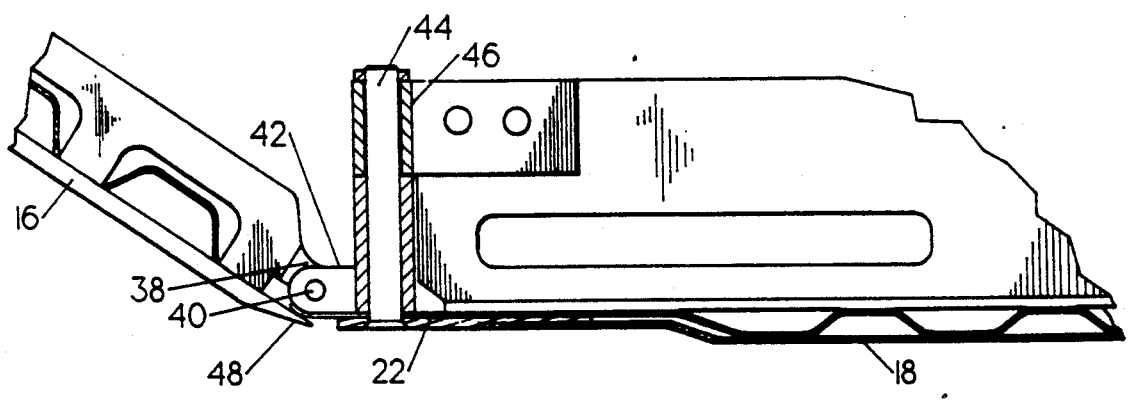
FIG. 2 is a section through the seal hinge area.
Figure 3:
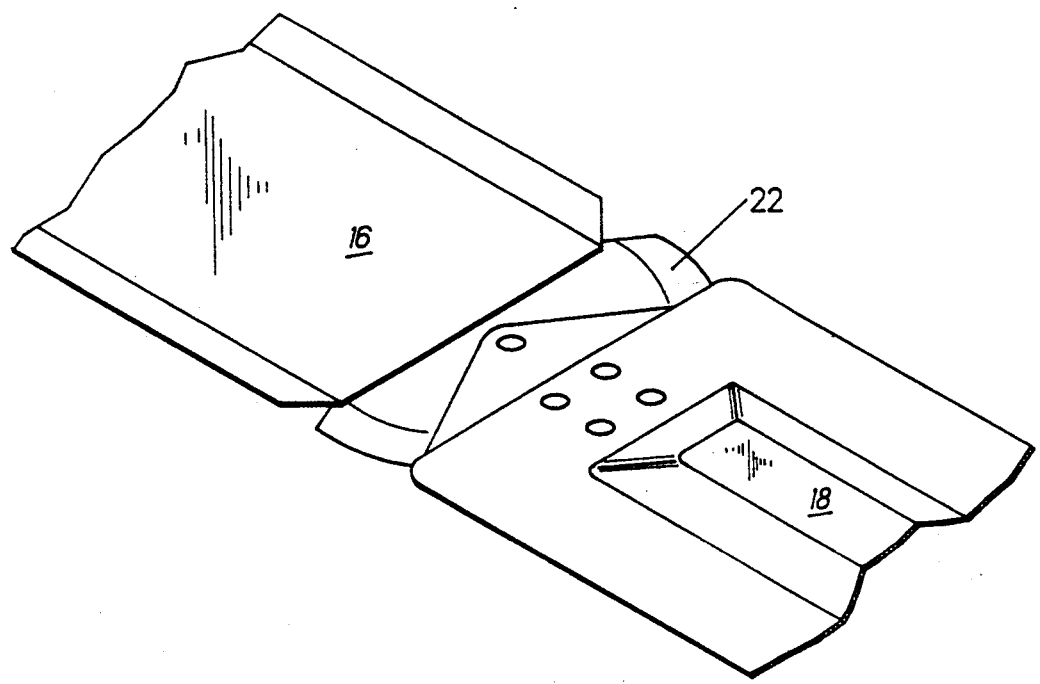
FIG. 3 is an isometric view showing the gas side of the seal arrangement.
Figure 4:
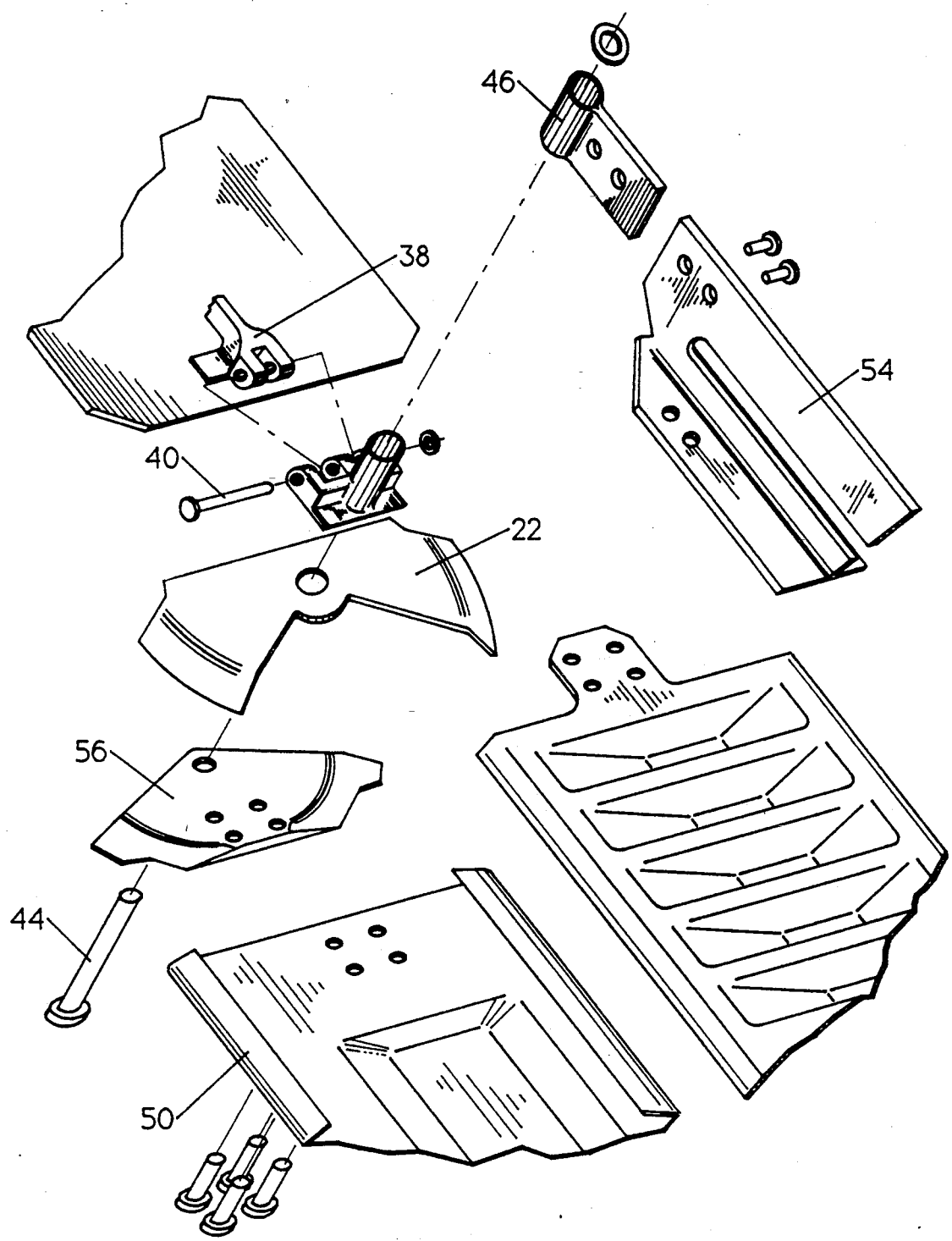
FIG. 4 is an exploded view of the seal hinge arrangement.

Referring to FIG. 2, a convergent yoke 38 (so called because it is secured to the convergent seal) is secured to convergent seal 16. Transverse pin 40 pivotally connects the convergent yoke 38 to intermediate yoke 42. A radial pin 44 secures the intermediate yoke to the divergent yoke 46.

The seal plate 22 is secured to the intermediate yoke and moves therewith. It is preferably spot welded to the yoke although it conceivably could be entrapped to move therewith. A seal surface 48 rides against and seals against the convergent seal 16. The sealing location rotates around the axis of pin 40 during movement of the two seals around that axis.

The seal 18 is formed of a face plate 50, a stiffening plate 52 and a backbone 54. It incorporates a reinforcing plate 56 secured together with the remaining portions of the seal by rivets 58. This reinforcing plate is adapted to rotatably seal against hinge seal 22 as the convergent seal 18 moves around the axis of pin 44 for vectoring purposes.

The sealing between the reinforcing plate 56 and plates rather than at any particular line. The hinge seal and reinforcing plate rotate around the axis of pin 44 relative to each other during, operation. The reinforcing plate fills and blocks the space between the face plate 50 and the stiffening plate 52.

I claim:

1. A seal hinge between a convergent seal and a divergent seal of a convergent/divergent nozzle comprising:
   a convergent yoke secured to said convergent seal;
   an intermediate yoke;
   a divergent yoke secured to said divergent seal;
   a transverse pin joining said convergent yoke and said intermediate yoke;
   a radial pin joining said intermediate yoke to said divergent yoke;
   a hinge seal comprising a thin plate secured to said intermediate yoke and sliding in sealing contact with said convergent seal; and
   said divergent seal in sliding sealing contact with said hinge seal.

2. A seal hinge as in claim 1 further comprising:

said convergent seal sliding along an arcuate path around the axis of said tranverse pin.

3. A seal hinge as in claim 1 further comprising:
said divergent seal sliding along an arcuate path around the axis of said radial pin.

4. A seal hinge as in claim 1 further comprising:
said radial pin located toward the divergent seal side of said transverse pin.

5. A seal hinge as in claim 2 further comprising: said divergent seal sliding along an arcuate path around the axis of said radial pin.

6. A seal hinge as in claim 5 further comprising:
said radial pin located toward the divergent seal side of said transverse pin.

7. A seal hinge as in claim 2 further comprising:
said radial pin located toward the divergent seal side of said transverse pin.

8. A seal hinge as in claim 3 further comprising:
said radial pin located toward the divergent seal side of said transverse pin.

* * * * *